United States Patent [19]

Knur et al.

[11] 4,402,374

[45] Sep. 6, 1983

[54] INDIVIDUAL-WHEEL DRIVE FOR VEHICLES

[75] Inventors: Walter Knur, Uttenreuth; Siegfried Winkelmann, Tettnang, both of Fed. Rep. of Germany

[73] Assignees: Zahnradfabrick Friedrichshafen A.G., Friedrichshafen; Siemens Aktiengesellschaft, Munich, both of Fed. Rep. of Germany

[21] Appl. No.: 304,030

[22] Filed: Sep. 21, 1981

Related U.S. Application Data

[63] Continuation of Ser. No. 77,621, Sep. 21, 1979, abandoned.

[30] Foreign Application Priority Data

Sep. 27, 1978 [DE] Fed. Rep. of Germany ....... 2842076

[51] Int. Cl.³ .............................................. B60K 7/00
[52] U.S. Cl. ............................. 180/65 F; 180/DIG. 3
[58] Field of Search .................. 180/65 F, 65 E, 308, 180/242, 243, DIG. 3, 10

[56] References Cited

U.S. PATENT DOCUMENTS

| 680,804 | 8/1901 | Newman et al. | 180/65 F |
|---|---|---|---|
| 2,258,328 | 10/1941 | Lee et al. | 180/65 F |
| 3,608,661 | 9/1971 | Arnot | 180/65 F |
| 3,812,928 | 5/1974 | Rockwell | 180/65 P |
| 4,043,226 | 8/1977 | Buuck | 180/65 F |
| 4,162,713 | 7/1979 | Heitman | 180/308 |

FOREIGN PATENT DOCUMENTS

| 2109372 | 9/1972 | Fed. Rep. of Germany | 180/65 F |
|---|---|---|---|
| 2743649 | 4/1978 | Fed. Rep. of Germany | 180/65 F |
| 79251 | 10/1962 | France | 180/65 F |
| 1414091 | 11/1975 | United Kingdom | 180/65 F |

*Primary Examiner*—David M. Mitchell
*Attorney, Agent, or Firm*—Kenyon & Kenyon

[57] ABSTRACT

An individual-wheel drive apparatus including an electric motor is disclosed. A two-stage planetary gear arrangement couples the motor to the wheel. The hollow gear of the planetary gear arrangement is fastened to the end bell of the motor. The outside surface of the hollow gear serves as the inner bearing race for the bearing of the wheel hub.

8 Claims, 1 Drawing Figure

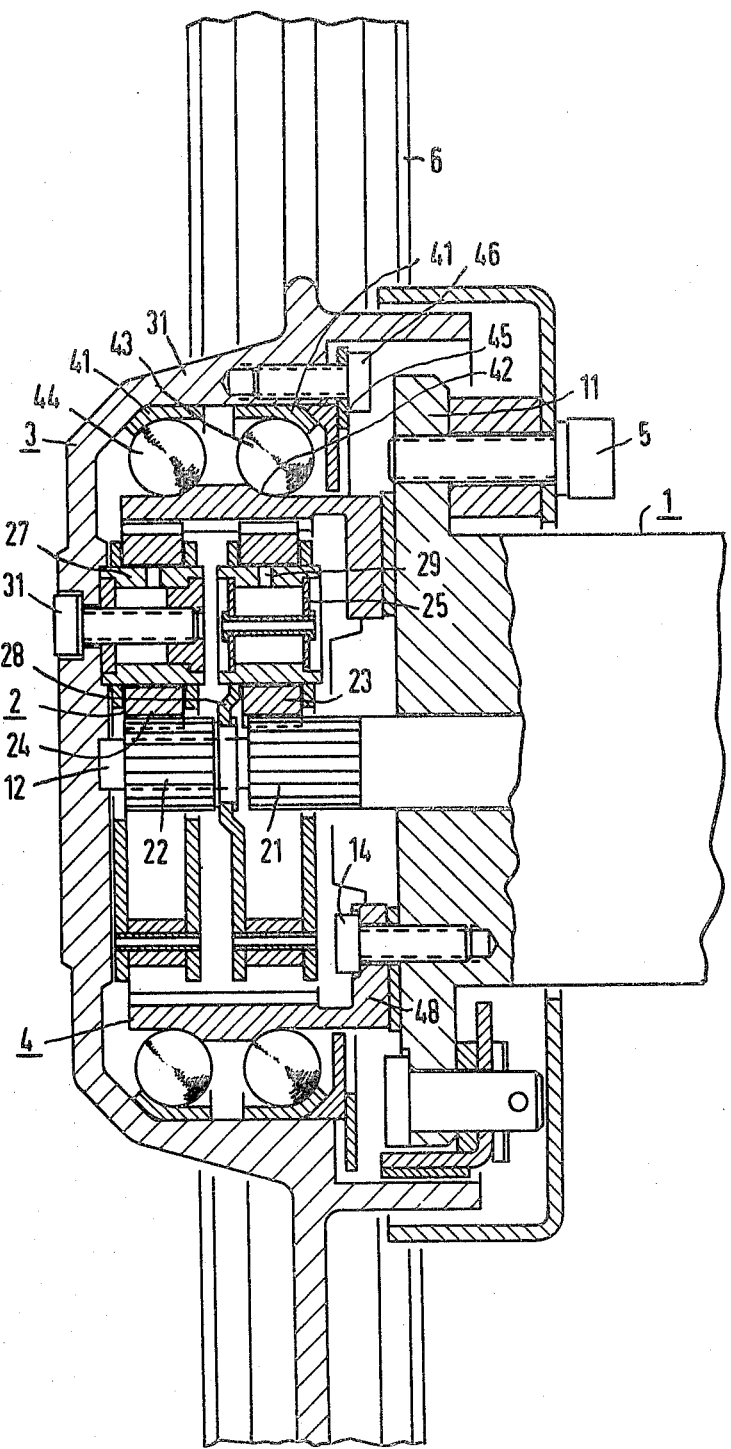

INDIVIDUAL-WHEEL DRIVE FOR VEHICLES

This is a continuation of application Ser. No. 77,621, filed Sept. 21, 1979 and now abandoned.

BACKGROUND OF THE INVENTION

The present invention relates to individual-wheel drive apparatus for vehicles.

German Auslegeschrift No. 2,109,372 discloses an individual-wheel drive apparatus which includes a two-stage planetary gear arrangement coupling the motor to the wheel. As disclosed in this German Auslegeschrift, the hollow gear of the planetary gear arrangement is bolted to a housing which is drawn over the motor. The hub of the running wheel is supported by bearings supported on the housing of the overall arrangement. This known individual-wheel drive arrangement, which is intended particularly for heavy construction machinery, is relatively expensive and requires considerable space. Therefore, it is not satisfactory for different drive purposes such as a drive for wheel chairs or the like.

SUMMARY OF THE INVENTION

It is an object of the present invention to provide an improved individual-wheel drive which is simple and compact.

According to the invention, single-wheel drive apparatus is provided with a planetary reduction gear arrangement in which a hollow or ring gear is fastened to the end bell of the motor and the outside surface of the hollow gear serves as the inner race of the bearing. This arrangement eliminates a bearing which can be expensive and reduces the space required in the axial and radial directions. In accordance with one aspect of the invention, an extension of the end bell is provided with cutouts, holes or the like which receive fastening means for fastening the individual-wheel drive apparatus to the vehicle.

According to another aspect of the invention, the bearing comprises two ball bearings arranged side by side on the hollow gear. The inner bearing races for the ball bearings are formed by the outside surface of the hollow gear and the outer bearing races comprise guide plates supported on the wheel hub.

Individual-wheel drive apparatus for vehicles are provided in accordance with the invention which comprise an electric motor disposed on the axle of the wheel to be driven for propelling the vehicle, and a planetary gear arrangement coupling the motor drive shaft to the wheel hub. The planetary gear arrangement includes at least one sun gear, at least one planetary gear and a hollow gear, the at least one planetary gear meshing with a respective sun gear and the hollow gear and disposed to rotate about the sun gear. The hollow gear is disposed within the wheel hub within the hollow gear. The motor includes an end bell to which the hollow gear is connected. A bearing is disposed between the hollow gear and the wheel hub with an inner bearing race of the bearing disposed in the outer surface of the hollow gear.

In accordance with the disclosed embodiment, the planetary gear arrangement comprises two stages, each stage including a sun gear and a planetary gear, the sun gear of the first stage being connected to the drive shaft of the motor, the planetary gear of the first stage being connected to the sun gear of the second stage, and the planetary gear of the second stage being connected to the wheel hub. The bearing includes two ball bearings arranged side by side on the hollow gear and an outer bearing race, the inner bearing race of the ball bearings being formed by the outside surface of the hollow gear and the outer bearing race of the ball bearings comprising sheet metal guides disposed on the inner surface of the wheel hub. Each of the ball bearings are disposed approximately in the plane of the planetary gears of the two stages of the planetary gear arrangement, the outer surface of the hollow gear including recesses formed by a raised portion for guiding the ball bearings.

The motor end bell is provided with cutouts, holes or the like for receiving fastening means for fastening the drive apparatus to the vehicle.

The planetary gears meshing with the hollow gear include a sliding sleeve at the periphery thereof and a generally radially extending passage from the interior of the planetary gears to the sleeve, the interior of the planetary gear being adapted to receive a grease charge which can be distributed through the passage to the sleeves.

The hollow gear includes an angle portion which extends radially relative to the axis of rotation, i.e. radially to the motor shaft. The angle portion of the hollow gear is connected to the end bell by fastening means, for example.

These and other aspects of the invention will be more apparent from the following description of the preferred embodiment thereof when considered with the accompanying drawing and appended claims.

BRIEF DESCRIPTION OF THE DRAWING

The present invention is illustrated by way of example and not limitation in the sole FIGURE of the accompanying drawing which is an axial section view of the individual-wheel drive apparatus of the invention.

DESCRIPTION OF THE PREFERRED EMBODIMENT

Referring more particularly to the drawing, an electric motor 1 is disposed on the axle of the vehicle. The motor 1 may be, for example, of the permanent excitation type having a rating of 400 W and a speed of 3000 RPM. The motor 1 is coupled on the drive side via its shaft 12 to a two-stage planetary reduction gear arrangement 2 with a reduction ratio of, for example, 1:49. The planetary reduction gear arrangement comprises sun gears 21 and 22, planetary gears 23, 24 and the hollow or ring gear 4 which is fastened to the end bell 11 of the motor 1 by means of screws 14. The sun gear 21 of the first stage is connected to the motor shaft. The first stage of the planetary gear arrangement is coupled to the second stage via the arm 28 connected to the planetary gear 23 of the first stage and to the sun gear 22 of the second stage. The planetary gear 27 of the second stage is connected in turn by screws 31 to the wheel hub 3 carrying the wheel 6. Torque may thus be transmitted from the motor to the wheel.

Hollow sliding-bearing sleeves 27 of the planetary gears 23, 24 are filled with grease and sealed laterally by washers 25. Grease reaches the sliding zones between the sliding-bearing sleeves 27 and the planetary gears 23, 24 through openings 29 in the planetary gears 23, 24.

The outside surface of the stationary hollow gear 4 serves as the inner bearing race for the two ball bearings 43 and 44. The two ball bearings 43 and 44 are guided in recesses 42 of the hollow gear 4. The recesses 42 are formed by a raised portion in the outer surface of the hollow gear. The outer bearing rings are formed by appropriately shaped sheet metal parts which are supported or braced in the hub portion 31 which is drawn over the bearing. A spring plate 45 pushed against the right-hand inner bearing race 41 by means of screw 46 retains the bearings on the race. The pressure applied against the bearings by the race 41 can be adjusted by screw 46.

An angled member 48 of the hollow gear 4 is fastened by means of screws 14 to the end bell 11 of the motor 1.

Holes for threaded bolts 5 are distributed over the circumference of the radial extension of the end bell 11 for fastening the drive apparatus to the vehicle.

In accordance with the invention described above, a compact and space-saving construction with a relatively simple bearing is obtained, which is of considerable importance in view of the large bearing diameter required.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purposes of the disclosure without departing from the spirit and scope of the invention.

What is claimed is:

1. Individual-wheel drive apparatus for vehicles, comprising an electric motor disposed on the axle of the wheel to be driven for propelling the vehicle, a planetary gear arrangement coupling the motor drive shaft to the wheel hub, the planetary gear arrangement including at least one sun gear, at least one planetary gear and a hollow gear, the hollow gear being disposed in the wheel hub, at least one planetary gear meshing with a respective sun gear and the hollow gear and disposed to rotate about the sun gear within the hollow gear, the motor including an end bell to which the hollow gear is connected, a bearing being disposed between the wheel hub and the hollow gear, the hollow gear including a common outer surface which is constituted by the material of the hollow gear and which constitutes the inner bearing race of the bearing.

2. The individual-wheel drive apparatus according to claim 1 in which the planetary gear arrangement comprises two stages, each stage including a sun gear and a planetary gear, the sun gear of the first stage being connected to the drive shaft of the motor, the planetary gear of the first stage being connected to the sun gear of the second stage, and the planetary gear of the second stage being connected to the wheel hub.

3. The individual-wheel drive apparatus according to claim 2 in which the bearing includes two ball bearings arranged side by side on the common outer surface of the hollow gear which constitutes the inner bearing race of the ball bearings, an outer bearing race of the ball bearings comprising sheet metal guides disposed on the inner surface of the wheel hub.

4. The individual-wheel drive apparatus according to claim 3, in which each of the ball bearings is disposed approximately in the plane of the diameter of a respective planetary gear of the two stages of the planetary gear arrangement, the outer surface of the hollow gear including recesses for guiding the ball bearings.

5. The individual-wheel drive apparatus according to claim 1 or 2 in which the motor end bell is provided with holes for receiving fastening means for fastening the apparatus to the vehicle.

6. The individual-wheel drive apparatus according to claim 1 or 2, in which the planetary gears meshing with the hollow gear include a sliding sleeve at the inner periphery thereof and a generally radially extending passage from the interior of the planetary gears to the sleeve, the interior of the planetary gears being adapted to receive a grease charge which can be distributed through the passage to the sleeves.

7. The individual-wheel drive apparatus according to claim 1 or 2, in which the hollow gear includes an angle portion which extends radially with respect to the motor shaft, the hollow gear being connected to the end bell at the angle portion.

8. Individual-wheel drive apparatus for vehicles, comprising an electric motor disposed on the axle of the wheel to be driven for propelling the vehicle, a planetary gear arrangement coupling the motor drive shaft to the wheel hub, the planetary gear arrangement including two stages each comprising a sun gear and at least one planetary gear, the planetary gear arrangement further comprising a hollow gear disposed in the wheel hub and in which are disposed the sun gears and the planetary gears of both stages of the planetary gear arrangement, each planetary gear meshing with a respective sun gear and the hollow gear and disposed to rotate about the sun gear within the hollow gear, the first stage being coupled to the drive shaft of the motor and to the second stage, and the second stage being coupled to the wheel hub, the motor including an end bell to which the hollow gear is connected, a bearing being disposed between the wheel hub and the hollow gear, the bearing comprising two ball bearings arranged side by side, the hollow gear including a common outer surface which is constituted by the material of the hollow gear and which constitutes the inner bearing race of each of the ball bearings.

* * * * *